United States Patent
Buschmann et al.

(10) Patent No.: US 8,305,443 B2
(45) Date of Patent: Nov. 6, 2012

(54) DEVICE FOR CAPTURING AN IMAGE OF THE EXTERNAL AREA OF A VEHICLE BY MEANS OF A CAMERA

(75) Inventors: Gerd Buschmann, Velbert (DE); Bernd Dammers, Oberhausen (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 994 days.

(21) Appl. No.: 12/227,325

(22) PCT Filed: May 5, 2007

(86) PCT No.: PCT/EP2007/003977
§ 371 (c)(1),
(2), (4) Date: Nov. 14, 2008

(87) PCT Pub. No.: WO2007/131651
PCT Pub. Date: Nov. 22, 2007

(65) Prior Publication Data
US 2009/0231430 A1 Sep. 17, 2009

(30) Foreign Application Priority Data
May 16, 2006 (DE) .......................... 10 2006 023 103

(51) Int. Cl.
*H04N 7/18* (2006.01)
(52) U.S. Cl. ...................................... 348/148
(58) Field of Classification Search ................. 348/148
See application file for complete search history.

(56) References Cited

U.S. PATENT DOCUMENTS

| 4,815,757 A * | 3/1989 | Hamilton .................... 280/764.1 |
| 2006/0171704 A1* | 8/2006 | Bingle et al. .................. 396/419 |

FOREIGN PATENT DOCUMENTS

| DE | 102 34 483 | 2/2004 |
| DE | 102004050297 | 4/2006 |
| EP | 1 332 923 | 8/2003 |
| EP | 1 529 688 | 5/2005 |
| JP | 56 099 835 | 8/1981 |
| JP | 2 144 239 | 6/1990 |
| JP | 11 245 729 | 9/1999 |
| WO | 01/68403 | 9/2001 |

* cited by examiner

*Primary Examiner* — John MacIlwinen
(74) *Attorney, Agent, or Firm* — Lucas & Mercanti, LLP; Klaus P. Stoffel

(57) ABSTRACT

In a device for capturing an image of the external area of a vehicle by means of a camera (20), there is a motor with a secondary transmission (40) which moves the camera (20) between a retracted position (10.1) and an extended position (10.2) relative to an aperture (51) in a vehicle wall (50). In order to realize a compact positioning of the camera in the retracted position, it is proposed to provide the sliding carriage with a sleeve-like cavity (11) which extends in the direction of movement (12) of the sliding carriage (10). The sliding carriage is therefore a sliding sleeve (10). The camera (20) is stored in a manner in which it can swivel (21) in the cavity (11) of the sliding sleeve (10), wherein the swivel axis (21) extends diagonal to its direction of movement (12). The camera (20) in its idle position is swivelled into the sleeve cavity, whereas in its operating position it projects at least partially through a side opening in the sleeve wall (16).

38 Claims, 4 Drawing Sheets

DEVICE FOR CAPTURING AN IMAGE OF THE EXTERNAL AREA OF A VEHICLE BY MEANS OF A CAMERA

The invention concerns a device of the type specified in the introductory clause of Claim 1. When the camera is not being used, it is positioned by a motor and a crank mechanism in a protected retracted position behind a vehicle wall. The camera is supported by a sliding carriage. When the camera is to be used, the sliding carriage is pushed into an extended position through an opening in the wall of the vehicle.

EP 1 332 923 A2 discloses a device of this type. The sliding carriage in the vehicle must be arranged at an angle of inclination that corresponds to the desired angle of view of the camera in its extended position. The same is true of devices according to WO 01/68403 A1, in which a camera can be extended from the body of the vehicle parallel to the roadway.

EP 1 529 688 A1 and DE 10 2004 050 297 A1 disclose devices of a different type, which are mounted on the rear side of a swiveling body part, e.g., on the rear side of a rotatably supported emblem. The camera in this case is located on the rear side of the body part. When it is to be used, this body part is swiveled out of a resting position into an inclined position, in which an optical system of the camera can acquire an image of the area of the roadway alongside the vehicle. Because the swivel bearings must be mounted in the resting remainder of the body, which encloses the swiveling body part on all sides, the devices of the latter type also take up a great deal of space.

In the previously known device of the type specified in the introductory clause of Claim 1, it is also well known that a cover, which can also be moved by the motor, can be provided in the vicinity of the opening in the wall of the vehicle. In the retracted position, the opening in the wall of the vehicle is covered by the cover, but in the extended position, the opening is uncovered.

In the document EP 1 332 923 A2 cited above, the cover is independently rotatably mounted on the outside of the vehicle wall and is connected with a projection on the sliding carriage by a connecting rod with points of articulation at both ends. When the sliding carriage is displaced, the cover is carried along by the connecting rod and, in the retracted position of the camera, arrives in a closed position that closes the opening. The connecting rod moves the cover into its open position to allow the camera to move into its extended position.

The objective of the invention is to develop a device of the type described in the introductory clause of Claim 1, which reliably acquires images of the outside area of the vehicle but at the same time has a space-saving design. This objective is achieved by the measures specified in Claim 1, which have the following special significance.

Because the sliding carriage in the invention has a sleeve-like cavity, which extends in the direction of displacement of the sliding carriage, the sliding carriage will be referred to hereinafter as a "sliding sleeve". The camera is rotatably mounted on a shaft in the cavity of the sliding sleeve. The shaft preferably extends transversely to the direction of displacement of the sliding sleeve. When the sliding sleeve is displaced, the camera is swiveled between two positions. There is a resting position, in which the camera is located essentially in the cavity of the sleeve, and the sliding sleeve is in its retracted position. However, there is also an extended position or operating position of the camera, in which the camera stretches out and projects through an opening in the wall of the sleeve. The sliding sleeve then assumes its extended position. This guarantees compact mounting of the device of the invention in the vehicle. The mounting area is limited practically to the cross section of the camera. In this regard, there isn't even any need to consider the position that the camera must assume when it is in use.

Additional measures and advantages of the invention are described in the dependent claims and illustrated in the drawings, which show a specific embodiment of the invention.

Figure 1:
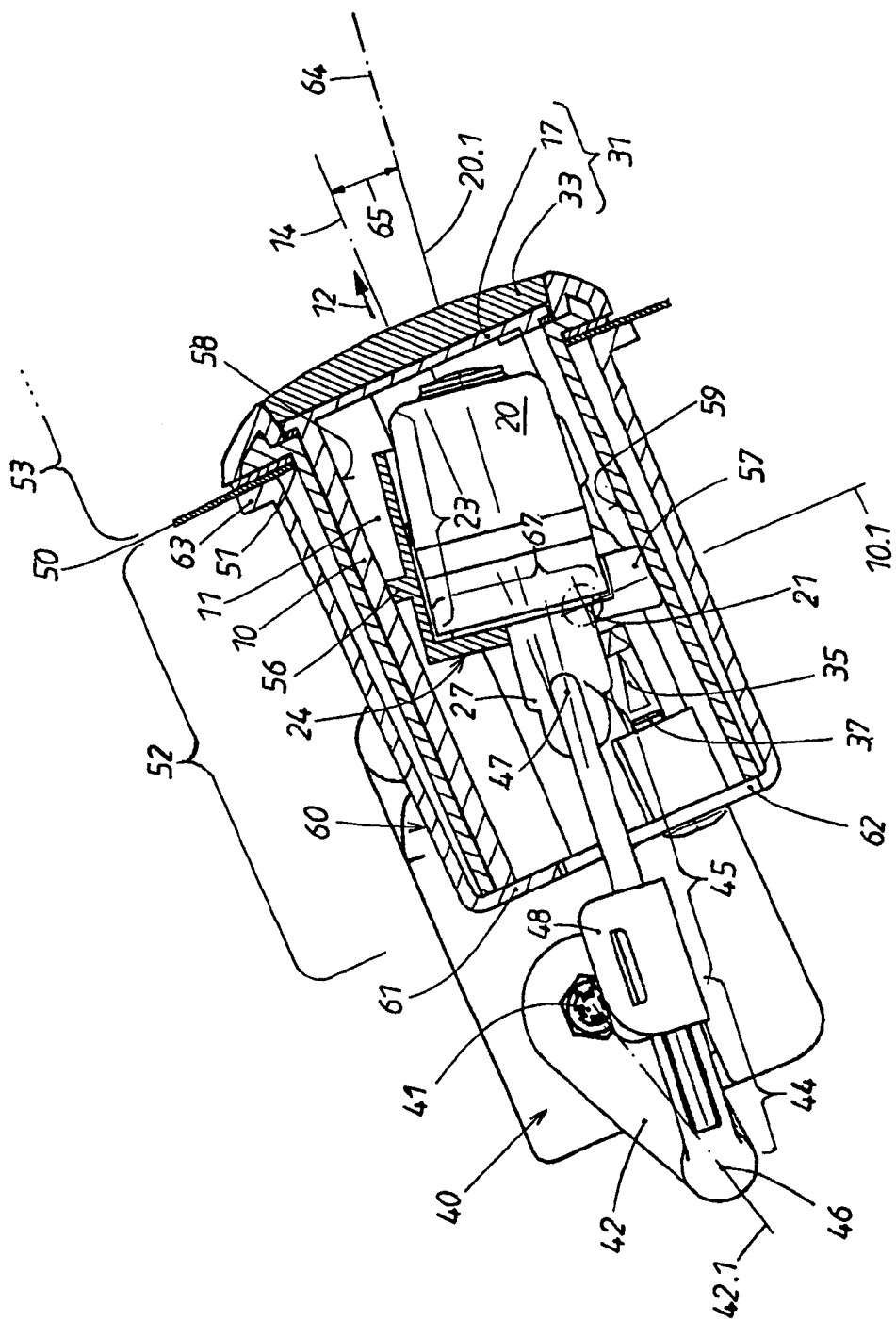
FIG. 1 shows a longitudinal section through the most important parts of the device of the invention with the sliding carriage in the retracted position and the camera in a resting position.
Figure 2:
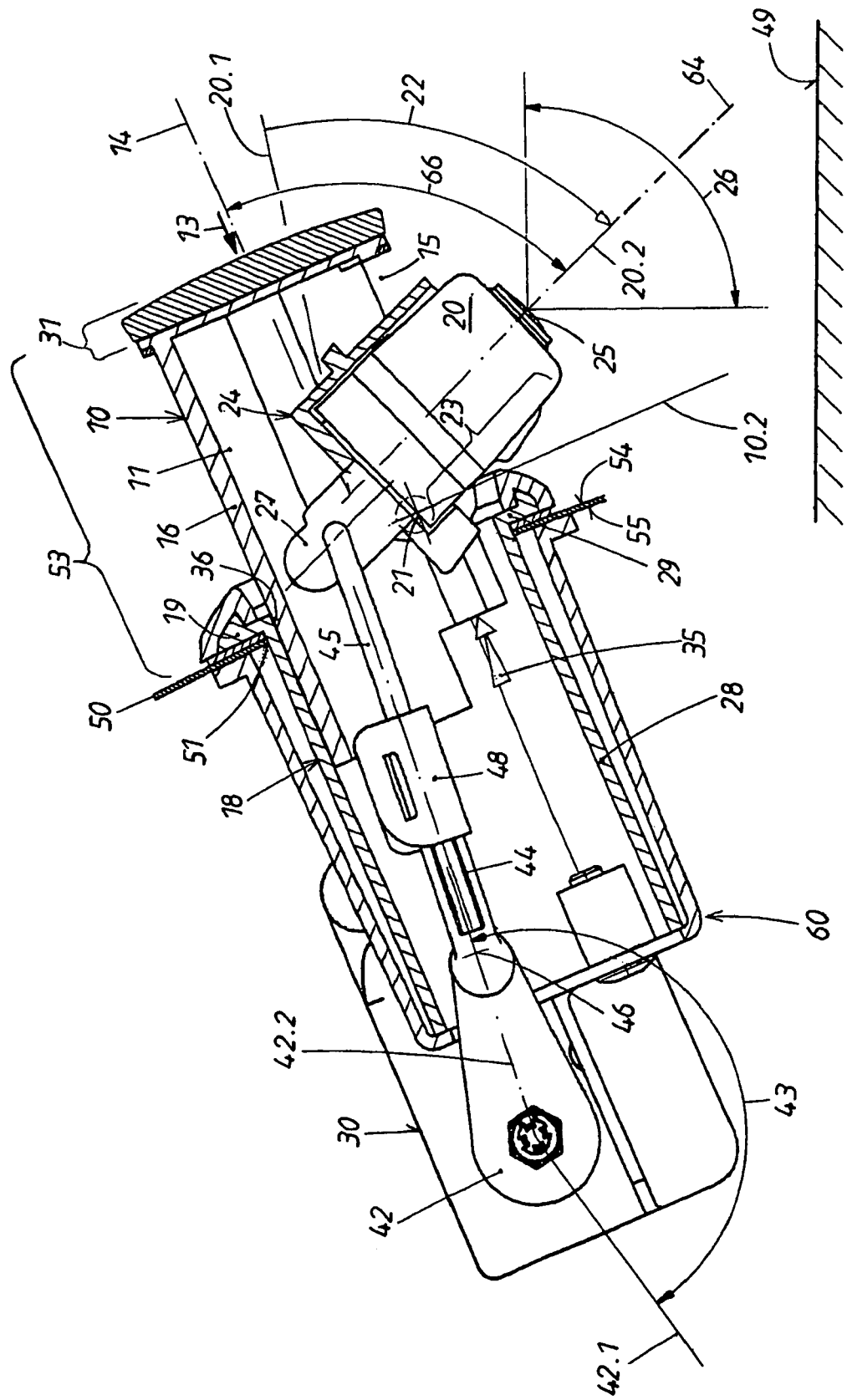
FIG. 2 is a longitudinal section that corresponds to FIG. 1 and shows the extended position of the sliding sleeve of the invention, in which the camera is stretched out and projects laterally outside of the sliding sleeve in its operating position.

In the invention, the sliding carriage is provided with a sleeve-like cavity 11, which extends in the direction of the displacement of the sliding carriage illustrated by the arrows 12 and 13 in FIGS. 1 and 2. Therefore, the sliding carriage can be called a "sliding sleeve", which is labeled in the drawings with the reference number 10. In the cavity 11 of the sliding sleeve 10, a camera 20 is rotatably supported on a shaft 21, which in the present embodiment extends transversely to the direction of displacement 12, 13. However, the axis of rotation could also be oriented in a different way with respect to the direction of displacement. In the present case, there is a standard motor 30, which, first of all, takes care of the displacement 12, 13 between two positions shown in FIGS. 1 and 2, namely, a retracted position 10.1 in FIG. 1 and an extended position 10.2 in FIG. 2. However, the same motor 30 also effects a swiveling movement 22 of the camera 20 between two positions 20.1, 20.2. An especially slim construction is obtained in the resting position 20.1 shown in FIG. 1, in which the camera 20 is positioned in an essentially longitudinally oriented way in the sleeve cavity 11. In the retracted resting position 20.1 of the camera 20, the camera's optical axis 64, which is indicated by a dot-dash line, is positioned either parallel to the longitudinal center axis 14 illustrated in FIG. 1 or at a small angle 65 to it. The mounting area is limited practically to the cross section of the camera 20. In this regard, there isn't even any need to consider the position that the camera must assume when it is in use.

FIG. 2 shows the other position 20.2 of the camera 20, in which the camera has been swiveled in the direction of the arrow 22 in FIG. 2 and projects through a lateral opening 15 in the wall of the sliding sleeve 10. As mentioned above, the sliding sleeve 10 is then positioned in its extended position 10.2. Although the camera 20 in the aforementioned resting position 20.1 is pointing in the "wrong direction" 64, it is now able to capture images of the desired outside area of the vehicle in the operating position 20.2 of FIG. 2. In the operating position 20.2, it is possible to reach every desired angular position 20.2 and value of the image acquisition angle 26 with which the given area of interest outside the vehicle is visually captured in images. In the operating position 20.2, the camera 20 takes in a large angle 66 relative to the longitudinal center axis 14 of the sliding sleeve 10. The camera 10 is then located in a position in which it projects at least partially from the sliding sleeve 10. This is possible, because the part of the sliding sleeve 10 that supports the camera 20 is located outside the vehicle wall 50 in its extended position 10.2.

According to FIG. 2, the optical aperture 25 of the camera has a large image acquisition angle 26 of, e.g., 160°. The vertical limitation of this image acquisition angle 26 can be an angle of more than 90°, e.g., 96°, relative to the vertical. These favorable optical conditions are possible in the invention due to the translational movements 12, 13 and the rotational movements 22 of the camera.

Figure 3:
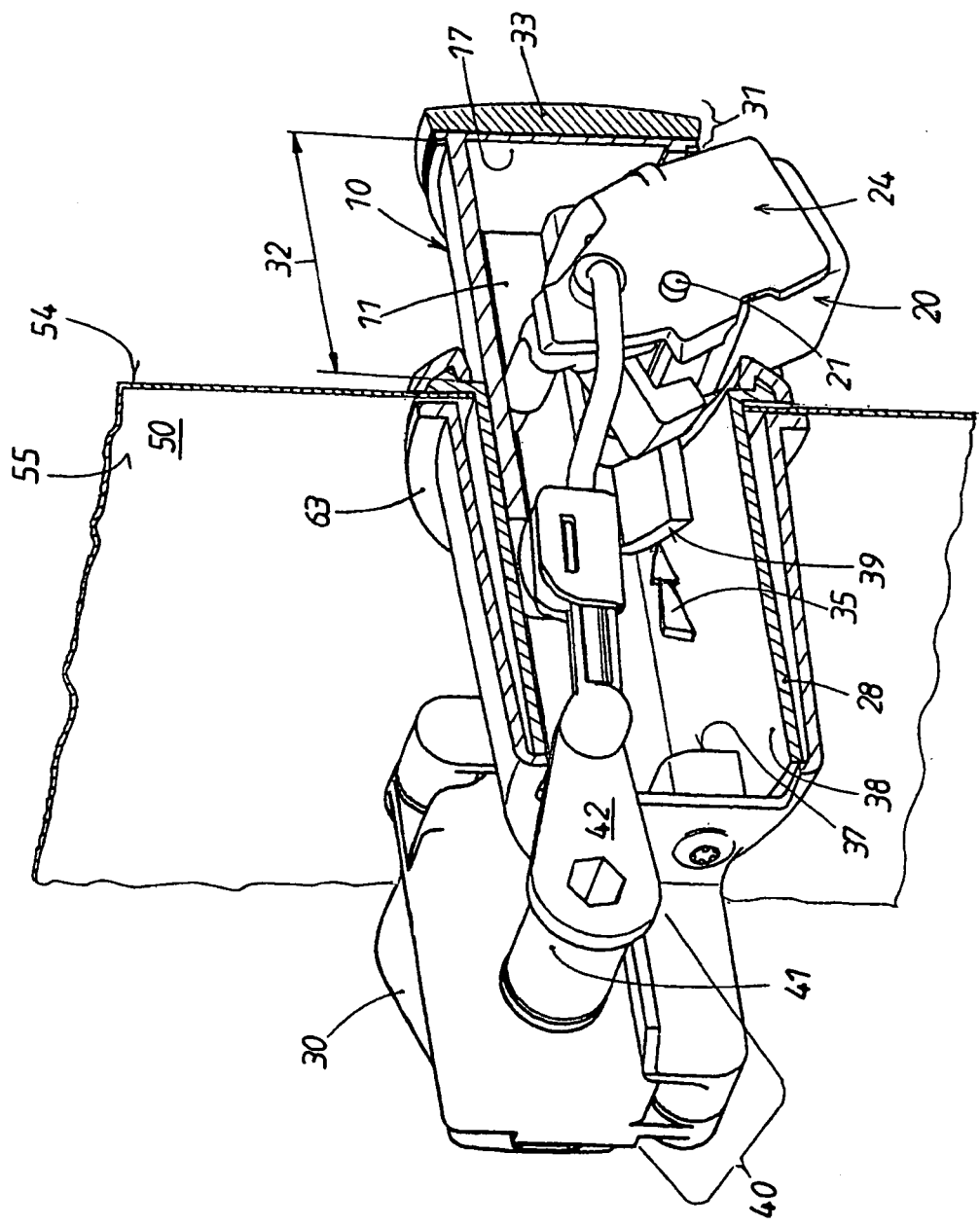
FIG. 3 shows a perspective rear view of the device.

In addition, the invention proposes a cover 31, which is a fixed part of the sliding sleeve 10. The cover 31 is mounted on the outer end face of the sliding sleeve 10 and carries out a linear stroke 32 when the sliding sleeve 10 is displaced 12, 13, as shown in FIG. 3. In the retracted position 10.1, the cover 31 is also retracted to cover and seal an opening 51 in the vehicle wall 50. The cover 31 is located on the outer base 17 of the sliding sleeve 10, which bounds the sleeve cavity 11 towards the outside. The cover 31 can be the support of an emblem 33, an ornamental wheel or any other desired functional part, e.g., a light unit. The cover 31 does not need a transmission mechanism of its own in accordance with the invention. Because the cover 31 is a fixed part of the sliding sleeve 10, a guide sleeve 18 of the sliding sleeve 10 also undertakes the movement of the cover in its linear stroke 32.

It is advantageous for the motor 30 to be a stepper motor, which in itself requires no limit stops for determining the retraction and extension positions 10.1, 10.2. This ensures low-noise running of the sliding sleeve 10 during the longitudinal displacement 12, 13 as well as quiet rotation 22 of the camera 20. Moreover, the same operating means are used, namely, e.g., a crank mechanism, for the translational movement 12, 13 and for the rotational movement 22. The present crank mechanism 40 consists of a crank arm 42 and a two-part connecting rod 44, 45.

The crank mechanism 40 is self-locking, so that the camera 20 is secured not only in its operating position 20.2 and resting position 20.1 but also in every intermediate position. The stepper motor 30 can reverse its direction of rotation when the extension movement 12 of the sliding sleeve 10 changes to the retraction movement 13. Finally, another part of the crank mechanism 40 is a spring (not shown), which exerts spring tension illustrated by a force arrow 35 on an axial shoulder 39 of a mount 24 for the camera 20. The other end of the compression spring is seated on a support point 37 of a bushing base 61, which is part of a housing bushing 60. The housing bushing 60 encloses the guide sleeve 18. The bushing base 61 has a hole 62, through which the crank mechanism 40 extends into the guide sleeve 18 located therein and reaches as far as the sliding sleeve 10.

The crank mechanism 20 comprises not only the aforementioned crank 42, which is driven by the motor 30, but also a connecting rod that consists of two segments 44, 45. The second connecting rod segment 45 is articulated with an arm 27 of the camera mount 24 at 27. The two connecting rod segments 44, 45 are linked by a coupling 48, which serves to mount or adjust the length of the connecting rod 44, 45. The crank 42 and the first connecting rod arm 44 of the connecting rod form a first pair of arms of a toggle joint, which is basically straight in the extended position 10.2 of the camera and is basically bent in the retracted position 10.1. However, there is also a second pair of arms of a toggle joint, which is formed by the second connecting rod segment 45 and the aforementioned arm 27 of the camera mount 24. As a comparison of FIGS. 1 and 2 shows, the position of this second pair of arms 27, 45 of the toggle joint works in the opposite way from the aforementioned first pair of arms 42, 44 of the toggle joint, namely, in the extended position 10.2 shown in FIG. 2, it is bent, and in the retracted position 10.1 shown in FIG. 1, it is essentially straight. When it rotates between the retracted position 10.1 and the extended position 10.2, the crank 42 carries out a rotation 43 that is less than or equal to 180°.

The outer end face opening 36 of the aforementioned guide sleeve 16, which is mounted in a stationary way in the vehicle, spans the aforementioned opening 51 in the vehicle wall 50. During the transition from the retracted position 10.1 to the extended position 10.2, the sliding sleeve 10 can telescope from this end face opening 36 of the guide sleeve 18. The outer end face of the guide sleeve 18 has a flange 19, which rests on the vehicle wall 50 in the mounted position of the device, preferably on its outside surface 54 according to FIG. 3. The guide sleeve flange 19 has an outwardly directed annular zone, which, during the stroke, serves as a contact surface for an end shoulder on the guiding sleeve 10. The guide sleeve 18 has a peripheral cylindrical surface 28, which in turn is surrounded by the housing bushing 60. This is not the case with the sliding sleeve 10.

At least in the area of the zone that faces the roadway 49 on which the vehicle is located, the sliding sleeve 10 has an opening 15 in its cylindrical surface 16. In the operating position 20.2, the camera 20 can swing partially out of this opening 15.

The housing bushing 60 can create a preassembled unit with the crank mechanism 40 and motor 30 connected to it, which is handled as a whole during installation in the vehicle wall 50. To allow it to be mounted, the housing bushing 60 has a mating flange 63, which, when the housing bushing 60 is mounted, is supported around the opening 51 on the rear surface 55 of the vehicle wall 50. The vehicle wall 50 is then clamped in sandwich fashion between the flange 19 of the guide sleeve 18 and the mating flange 63 of the housing bushing 60. The motor and the crank mechanism 40 can also be provided with a jacket (not shown), which is fastened on the housing bushing 60.

The camera mount 24 can have one or more limit stops 56, 57, which in the retracted resting position 20.1 of the camera 20, are supported on shoulders 58, 59 inside the sliding sleeve 10. In the present case, limit stops 56, 57 of this type consist of webs in the peripheral area of the camera mount 24. The shoulders 58, 59 consist of inner surfaces of the sleeve wall 16 of the sliding sleeve 10.

In the retracted position 10.1 of FIG. 1, the camera 20 and its axis of rotation 21 are located behind the vehicle wall 50 in the inner spatial region 52. In the extended position 10.2, on the other hand, they are located essentially in the outer spatial region 53 in front of the vehicle wall 50. The sliding sleeve 10, the guide sleeve 18 and finally the housing bushing 60 are telescoped within one another and have a linear arrangement in the vehicle. This linear arrangement determines the direction of displacement 12, 13 of the sliding sleeve 10. The crank mechanism 40 described above is positioned at least partly in alignment with the linear arrangement of the sliding sleeve 10, the guide sleeve 18 and the housing bushing 60.

In order to set the camera effectively, even in the dark, a light unit (not shown) could also be assigned to it. A light unit of this type could be motionally coupled or even connected with the camera 20 to allow it to move conformally with the camera. It is advisable for the camera 20 and the light unit simultaneously to carry out both the translational movements 12, 13 between the retracted position 10.1 and the extended position 10.2 and the rotational movements 22 between the resting position 20.1 and the operating position 20.2.

The start of the extension movement 12 and/or the retraction movement 13 can be associated with certain functions in the vehicle. For example, the extension movement 12 can start when the vehicle is placed in reverse. The retraction movement 13 could start as soon as the vehicle is moving forward at a well-defined speed. Alternatively, the retraction

Figure 4:
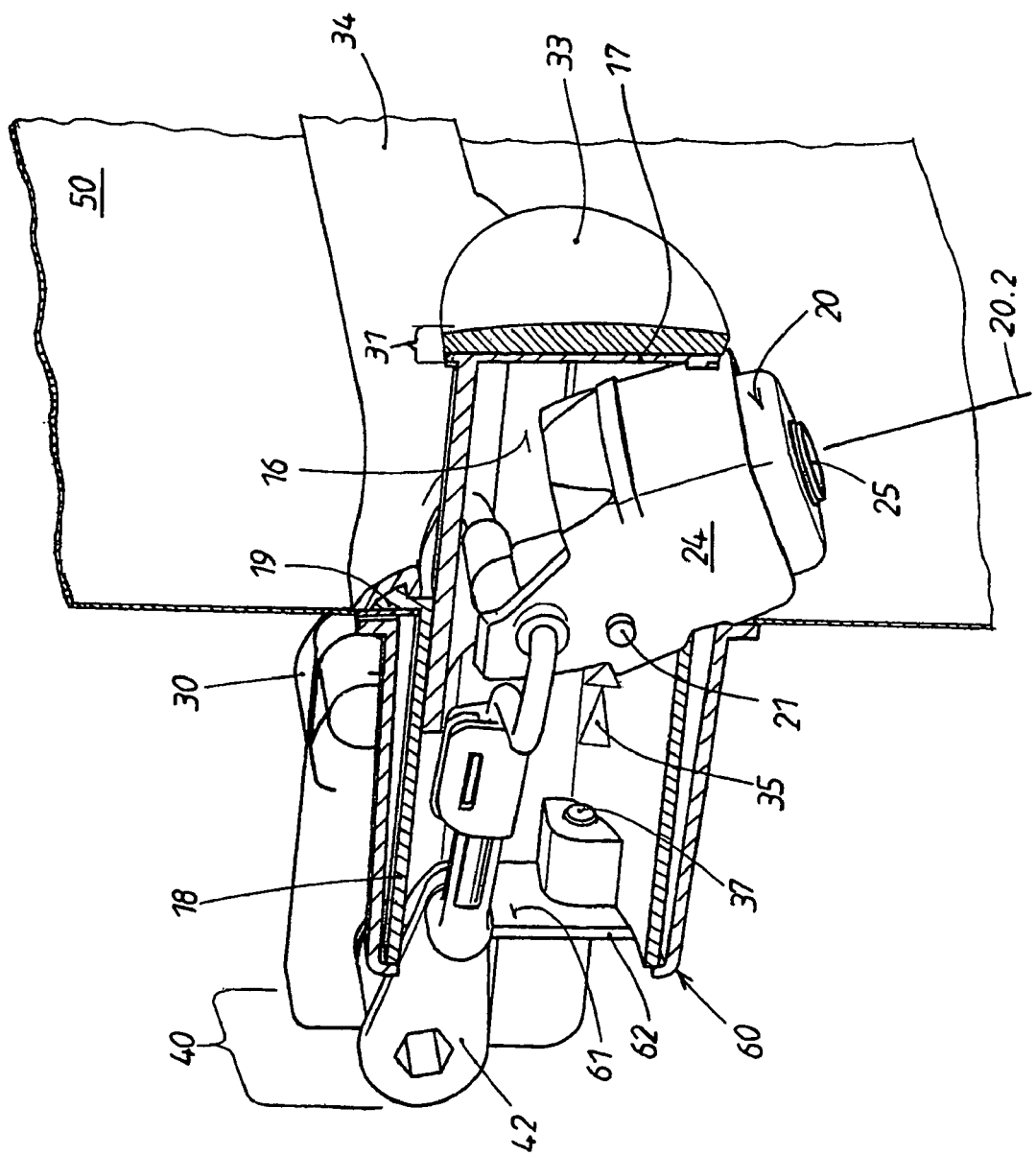
FIG. 4 shows a perspective front view of the same device.

LIST OF REFERENCE NUMBERS 10 sliding carriage, sliding sleeve
10.1 auxiliary line of the retracted position of 10 (FIG. 1)
10.2 auxiliary line of the extended position of 10 (FIG. 2)
11 sleeve-like cavity, sleeve cavity
12 extension movement of 10, displacement arrow towards the outside (FIG. 1)
13 retraction movement of 10, displacement arrow towards the inside (FIG. 2)
14 longitudinal center axis of 10 and 18 (FIG. 2)
15 lateral opening in 10 (FIG. 2)
16 sleeve inner wall of 10, cylindrical surface (FIG. 2)
17 outer base of 10 (FIG. 1)
18 guide sleeve of 10 (FIG. 2)
19 flange on 18 (FIG. 2)
20 camera
20.1 auxiliary line of the resting position of 20 (FIG. 1)
20.2 auxiliary line of the operating position of 20 (FIG. 2)
21 shaft
22 arrow of the rotational movement of 20 (FIG. 2)
23 longitudinal dimension of 20 (FIGS. 1, 2)
24 mount for 20
25 optical aperture in 20 (FIGS. 2, 4)
26 image acquisition angle of 20 (FIG. 2)
27 arm on 24
28 cylindrical surface of 18
29 annular zone on 19, contact surface for 31 (FIG. 2)
30 motor, motor cover (FIG. 3)
31 cover for 51
32 stroke of 31 (FIG. 3)
33 emblem (FIG. 4)
34 ornamental wheel (FIG. 4)
35 arrow of spring tension, compression spring force
36 end face opening of 18 (FIG. 2)
37 support point of the compression spring on 61 (FIG. 1)
38 open, inner end face of 18 (FIG. 3)
39 axial shoulder on 10 for the compression spring (FIG. 3)
40 crank mechanism (FIG. 3)
41 output shaft of crank mechanism (FIG. 1)
42 crank
42.1 auxiliary line for the initial position of 42 (FIG. 1)
42.2 auxiliary line for the final position of 42 (FIG. 2)
43 path of the rotational movement of 42 between 42.1 and 42.2 (FIG. 2)
44 first segment of the connecting rod
45 second segment of the connecting rod
46 point of articulation between 42, 44, end of the crank (FIGS. 1, 2)
47 second point of articulation between 45, 27 (FIG. 1)
48 coupling between 44, 45, clip
49 course of the travel path of the vehicle with respect to 14 (FIG. 2)
50 vehicle wall
51 opening in 50
52 rear spatial region of 50 (FIG. 1)
53 front spatial region of 50 (FIG. 1)
54 outside surface of 50 (FIG. 2)
55 inside surface of 50 (FIG. 2)
56 first limit stop on 24 (FIG. 1)
57 second limit stop on 24 (FIG. 1)
58 shoulder for 56 (FIG. 1)
59 shoulder for 57 (FIG. 1)
60 housing bushing (FIG. 1)
61 bushing base of 60 (FIG. 1)
62 hole in 61 for 42
63 mating flange of 60 (FIGS. 1, 3)
64 optical axis of 20 (FIGS. 1, 2)
65 small angle between 64, 14 (FIG. 1)
66 large angle between 64, 14 (FIG. 2)
67 transverse dimension of 20 (FIG. 1)

The invention claimed is:

1. A device for image acquisition of a region outside of a vehicle, the device comprising:
a camera (20);
an image display system in an interior of the vehicle, the camera being linked with the image display system;
a sliding carriage (10) having a cavity (11)
a shaft (21) arranged in the cavity (11), the camera (20) being mounted on the shaft (21) so as to be swivelable between two positions (20.1, 20.2) that are separated by an angle (22), the positions including a retracted resting position (20.1) in which the camera (20) is in a first angular position (65) in the sliding carriage (10) adapted to the cavity (11), and an extended operating position (20.2) in which the camera (20) extends out of the sliding carriage (10) through a lateral opening (15) in a sleeve wall, (16),
wherein the sliding carriage (10) together with the camera (20) is displaceable relative to an opening (51) in a vehicle wall (50) between the two axially separated positions (10.1, 10.2), axial separated positions including a retracted position (10.1) behind (52) the vehicle wall (50) where there is a minimum space for accepting the camera (20), and an extended position (10.2) outside the opening (51) and in front of the vehicle wall (50), wherein a space for accepting the camera (20) is telescopically extended,
wherein in the retracted position (10.1) of the sliding carriage (10) the camera (20) is in the resting position (20.1) and in the extended position (10.2) of the sliding carriage (10) the camera (20) is in the operating position (20.2).

2. The device in accordance with claim 1, further comprising a motor (30) with a crank mechanism (40) arranged to telescopically move the sliding carriage (10) and/or swivel the camera (20).

3. A device in accordance with claim 2, with a cover (31), which is simultaneously moved by the motor (30) and covers the opening (51) in the vehicle wall (50) in the retracted position (10.1) and uncovers the opening in the extended position (10.2), wherein
the cover (31) is part of the sliding carriage (10) and carries out a linear stroke (32) during the displacement (12, 13) of the sliding (10),
and where the cover (31) closes and seals the opening (51) in the vehicle wall (51) in the retracted position (10.1).

4. A device in accordance with claim 3, wherein the cover (31) is fixed on the outer end face of the sliding carriage (10) and forms an outer base (17) of the cavity (11).

5. A device in accordance with claim 3, wherein the cover (31) is the support of an emblem (33), an ornamental wheel, or a functional part.

6. A device in accordance with claim 2, wherein the camera (20) is positioned in a mount (24) which has the shaft (21), and where the shaft (21) serves to rotationally support the camera (20) on an inner wall (16) of the carriage.

7. A device in accordance claim 6, wherein a drive unit comprises not only the motor (30) and the crank mechanism (40) but also at least one spring force (35) acting on the sliding carriage (10), and where the spring force (35) moves (12) the sliding carriage (10) into the extended position (10.2).

8. A device in accordance with claim 7, wherein the sliding carriage (10) is held in a stationary guide sleeve (18) in a way that allows the sliding carriage to be longitudinally displaced,
where an outer end face opening (36) of the stationary guide sleeve (18) spans the opening (51) in the vehicle wall (50),
and where, during a transition from the retracted position (10.1) to the extended position (10.2), the sliding carriage (10) can telescope from the outer end face opening (36) of the stationary guide sleeve (18).

9. A device in accordance with claim 8, wherein the outer end face of the stationary guide sleeve (18) has a flange (19), which rests on the vehicle wall (50) in a mounted position of the device.

10. A device in accordance with claim 9, wherein the flange (19) has an outwardly directed annular zone (29), which serves as a contact surface for a linearly displaceable cover (31) or sleeve base (17),
wherein when the cover (31) contacts the annular zone (29), the sliding carriage (10) is then positioned in the retracted, position (10.1) and closes the outer and face opening (36) of the stationary guide sleeve (18).

11. A device in accordance with claim 9, wherein at least certain segments of the stationary guide sleeve (18) are enclosed and protected by a housing bushing (60),
and where a base (61) of the housing bushing (60) has a hole (62), through which the crank mechanism (40) extends into the stationary guide sleeve (18) and reaches as far as the sliding carriage (10).

12. A device in accordance with claim 11, wherein the spring force (35) is produced by a compression spring,
and where one end of the compression spring is supported on a support point (37) of the base (61) of the housing bushing (60), and another end of the compression is supported on an axial shoulder (39) of the sliding carriage (10).

13. A device in accordance with claim 11, wherein the housing bushing (60) has a mating flange (63), which is supported around an opening (51) on a rear surface (55) of the vehicle wall (50),
and where the vehicle wall (50) is clamped in sandwich fashion between the flange (19) of the stationary guide sleeve (18) and the mating flange (63) of the housing bushing (60).

14. A device in accordance with claim 11, wherein the housing bushing (60) supports an additional jacket of the motor (30) and/or the crank mechanism (40).

15. A device in accordance with claim 11, wherein the sliding carriage (10), the guide sleeve (18), and the housing bushing (60) are telescoped within one another and have a linear arrangement relative to one another in the vehicle, which is determined by a direction of displacement (12, 13) of the sliding carriage (10).

16. A device in accordance with claim 15, wherein the motor (30) and/or the crank mechanism (40) is at least partly aligned with the linear arrangement of the sliding carriage (10), the stationary guide sleeve (18), and the housing hushing (60).

17. A device in accordance with claim 8, wherein the stationary guide sleeve (18) has a peripheral cylindrical surface (28), but the crank, mechanism (40, 42) enters an interior of the guide sleeve through an opening at an inner end face (38) of the stationary guide sleeve (18) and continues as far as the sliding carriage (10).

18. A device in accordance with claim 8, wherein a longitudinal center axis (14) of the stationary guide sleeve (18) and a direction of displacement (13, 14) of the sliding carriage (10) are parallel or inclined to a travel path (49) of the vehicle.

19. A device in accordance with claim 8, wherein the rotatably supported camera mount (24) has one or more limit stops (56, 57), which, in the retracted resting position (20.1) of the camera (20), are supported on shoulders (58, 59) inside the sliding carriage (10) and/or the stationary guide sleeve (18).

20. A device in accordance with claim 19, wherein the limit stops (56, 57) consist of webs in a peripheral area of the camera mount (24),
and where the shoulders (58, 59) that serve as supports consist of inner surfaces of a sleeve wall (16) of the sliding carriage (10) and/or the stationary guide sleeve (18).

21. A device in accordance claim 6, wherein the crank mechanism (40) comprises a crank (42) rotationally driven by the motor (30) and a connecting rod (44, 45),
where the connecting rod (44, 45) articulates at one end with an end (46) of the crank (42) and articulates (47) at another end with an arm (27) of the camera mount (24).

22. A device in accordance with claim 21, wherein the connecting rod consists of two segments (44, 45), including a first (44) segment attached to the crank (42), and a second (45) segment attached to arm (27) of the camera mount (24),
and where the two connecting rod segments (44, 45) are coupled (48) with each other.

23. A device in accordance with claim 22, wherein the coupling (48) allows the connecting rod (44, 45) to be assembled and/or a length of the connecting rod to be adjusted.

24. A device in accordance claim 21, wherein the crank (42) and the connecting rod (44, 45) that articulates with the crank form a first pair of arms of a toggle joint,
which is substantially straight in the extended position (10.2) and bent in the retracted position (10.1).

25. A device in accordance with claim 24, wherein the connecting rod (44, 45) and arm (27) of the camera mount (24) that articulates with the connecting rod form a second pair of arms of a toggle joint,
which is bent in the extended position (10.2) and substantially straight in the retracted position (10.1).

26. A device in accordance with claim 21, wherein the crank (42) of the crank mechanism (40) carries out a rotation (43) between the retracted position (10.1) and the extended position (10.2) that is less than or equal to 180°.

27. A device in accordance with claim 2, wherein the motor (30) and the crank mechanism (40) are used both to displace (12, 13) the sliding carriage (10) and to rotate (22) the camera (20).

28. A device in accordance with claim 27, wherein the crank mechanism (40) is self-locking, and the camera (20) is secured in the operating position (20.2), the resting position (20.1), and/or in every intermediate position between them.

29. A device in accordance with claim 2, wherein the motor (30) reverses direction of rotation when the motor changes from extension movement (12) of the sliding carriage (10) to retraction movement (13).

30. A device in accordance with claim 2, wherein the motor (30) is a stepper motor that determines the retracted position (10.1) and/or the extended position (10.2) of the sliding carriage (10) without limit stops.

31. A device in accordance with claim 2, wherein a light unit is integrally connected with the camera (20) and moves together with the camera (20) to carry out both translational movements (12, 13) between the retracted position (10.1) and the extended position (10.2) and rotational movements (22) between the resting position (20.1) and the operating position (20.2).

32. The device in accordance with claim 1, wherein the shaft (21) extends transversely to a telescopic displacement direction (12, 13) of the sliding carriage (10).

33. A device in accordance with claim 32, wherein extension movement (12) of the sliding carriage starts when the vehicle is placed in reverse.

34. A device in accordance with claim 33, wherein retraction movement (13) starts when the vehicle is moving forward at a well-defined, speed and/or a certain time after the reverse movement of the vehicle has ended.

35. A device in accordance with claim 1, wherein the camera (20) rotates (22) with the displacement (12, 13) of the sliding carriage (10).

36. A device in accordance with claim 1, wherein, in the retracted resting position (20.1), the camera (20) is positioned in a longitudinally oriented way in the cavity (11).

37. A device in accordance with claim 1, wherein, at least in an area of a zone that faces a roadway (49) on which the vehicle is located, the sliding carriage (10) has an opening (15) in a cylindrical surface (16) of the sliding carriage, and in the operating position (20.2), the camera (20) can swing at least partially out of the opening (15) in the sleeve wall.

38. A device in accordance with claim 1, wherein, in the retracted resting position (20.1) of the camera (20), an optical axis (64) of the camera (20) is positioned parallel to or at the first angle (65) to a longitudinal center axis (14) of the sliding carriage (10), which points in a direction of displacement (12, 13), while in the extended operating position (20.2), the optical axis (64) of the camera assumes a second angle (66) relative to the longitudinal center axis (14) that is larger than the first angle.

* * * * *